(12) United States Patent
Dufford

(10) Patent No.: US 9,797,505 B2
(45) Date of Patent: Oct. 24, 2017

(54) SYSTEM AND METHOD FOR ALERTING/DOWNSHIFTING IN RESPONSE TO AN UPCOMING DOWNGRADE

(71) Applicant: Toyota Motor Engineering & Manufacturing North America, Inc., Erlanger, KY (US)

(72) Inventor: Mohammad E. Dufford, Los Angeles, CA (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 160 days.

(21) Appl. No.: 14/826,348

(22) Filed: Aug. 14, 2015

(65) Prior Publication Data

US 2017/0045137 A1    Feb. 16, 2017

(51) Int. Cl.
| | | |
|---|---|---|
| *F16H 61/02* | (2006.01) | |
| *F16H 59/70* | (2006.01) | |
| *F16H 59/54* | (2006.01) | |
| *F16H 59/44* | (2006.01) | |
| *F16H 59/66* | (2006.01) | |
| *F16H 63/42* | (2006.01) | |

(52) U.S. Cl.
CPC ......... *F16H 61/0213* (2013.01); *F16H 59/44* (2013.01); *F16H 59/54* (2013.01); *F16H 59/70* (2013.01); *F16H 2059/663* (2013.01); *F16H 2059/666* (2013.01); *F16H 2059/704* (2013.01); *F16H 2061/0237* (2013.01); *F16H 2063/426* (2013.01)

(58) Field of Classification Search
None
See application file for complete search history.

(56) References Cited

U.S. PATENT DOCUMENTS

| | | | |
|---|---|---|---|
| 5,053,963 | A | 10/1991 | Mack |
| 5,113,721 | A | 5/1992 | Polly |
| 5,166,879 | A | 11/1992 | Greene et al. |
| 5,689,998 | A | 11/1997 | Lee |
| 5,911,771 | A | 6/1999 | Reichart et al. |
| 5,995,895 | A | 11/1999 | Watt et al. |
| 6,085,137 | A | 7/2000 | Aruga et al. |
| 7,987,034 | B2 | 7/2011 | Taffin |

(Continued)

FOREIGN PATENT DOCUMENTS

GB    2479707    10/2011

*Primary Examiner* — Justin Holmes
(74) *Attorney, Agent, or Firm* — Snell & Wilmer L.L.P.

(57) ABSTRACT

A system for reducing the likelihood of brakes of a vehicle overheating when towing a trailer includes a transmission configured to operate in a plurality of gear ratios and a GPS unit configured to detect location data. The system also includes an input device configured to receive data indicating whether the trailer is connected to the vehicle and an ECU coupled to the transmission, the GPS unit and the input device. The ECU is designed to determine whether the vehicle is within a predetermined distance of a downgrade of a road based on the location data, determine a current gear ratio of the transmission and determine whether it is desirable for the transmission to operate in a second gear ratio that is lower than the current gear ratio based on whether the trailer is connected, whether the vehicle is within the predetermined distance, and the current gear ratio.

19 Claims, 7 Drawing Sheets

(56) References Cited

U.S. PATENT DOCUMENTS

| | | |
|---|---|---|
| 8,554,430 B2 | 10/2013 | Vandekerkhove |
| 8,634,939 B2 | 1/2014 | Martin et al. |
| 8,708,072 B2 | 4/2014 | Montocchio et al. |
| 8,731,788 B2 | 5/2014 | Sujan et al. |
| 2008/0059036 A1* | 3/2008 | Imai .................... B60W 30/143 |
| | | 701/93 |
| 2012/0245812 A1 | 9/2012 | Anderson et al. |
| 2013/0297161 A1* | 11/2013 | Gibson ................ B60W 20/00 |
| | | 701/54 |
| 2014/0188350 A1 | 7/2014 | Popham et al. |

* cited by examiner

| SEGMENT | NEXT SEGMENT | NEXT LIKELIHOOD | ALTERNATIVE NEXT SEGMENT(S) | LIKELIHOOD | GRADE | LENGTH | PREVIOUSLY DETECTED DATA |
|---|---|---|---|---|---|---|---|
| S1 | S2 | 100% | | | 0% | 5 mi | DOWNSHIFT |
| S2 | S4 | 80% | S3 | 20% | 4% | 3 mi | EXCESSIVE BRAKING DETECTED |
| S3 | S8 | 100% | | | 0% | 4 mi | NO |
| S4 | S5 | 100% | | | 6% | 2 mi | NON-REQUESTED ACCELERATION |
| S5 | S6 | 100% | | | 3% | 2 mi | BRAKE TEMP ABOVE THRESHOLD |
| S6 | | | | | 0% | 3 mi | BRAKE TEMP ABOVE THRESHOLD |

FIG. 5C

SYSTEM AND METHOD FOR ALERTING/DOWNSHIFTING IN RESPONSE TO AN UPCOMING DOWNGRADE

BACKGROUND

Field

The present disclosure relates to systems and methods for determining whether a transmission downshift of a vehicle towing a trailer is desirable due to a downslope and for alerting the driver of a desirable downshift and/or automatically downshifting the transmission when desirable.

Description of the Related Art

Vehicles can occasionally accelerate when traveling along a downslope (i.e., on a downhill portion of road) due to gravity. Whether the vehicle accelerates and the rate of acceleration of the vehicle can be affected by numerous factors such as a grade (i.e., slope) of the downslope, a length of the downslope and a weight of the vehicle. Many large trucks are thus more prone to accelerate while traveling along a downslope than personal vehicles (such as cars, SUVs and pickup trucks) due to the difference in weight. However, vehicle load can significantly increase if a trailer is hitched to the vehicle. Thus, vehicles hitched to trailers are more susceptible to undesired acceleration while traveling downhill.

When a vehicle begins to accelerate while traveling along a downslope, the vehicle must brake in order to maintain a constant speed. If the downslope is relatively long and/or has a relatively large grade, a relatively large amount of braking may need to be applied. The relatively large amount of braking can be undesirable because brakes can overheat after a sufficient amount of braking. Functionality and remaining use of the brakes may decrease as the brakes continue to overheat.

Engine braking (i.e., reducing the gear of the vehicle to slow down) can be used to reduce acceleration along the downgrade. Some experienced drivers will thus downshift when they are aware of an upcoming downslope, particularly if the downslope has a relatively large grade and length. However, not all downslopes are indicated by a sign, and it may be undesirable to downshift while traveling downhill due to potential torque disturbances.

The brakes may also overheat when used to decelerate a vehicle having a relatively large load as the vehicle slows down to follow a curve or make a turn.

Thus, there is a need for systems and methods for determining the location of downslopes and turns and for alerting the driver to an upcoming downslope and/or for automatically shifting the transmission to a higher gear ratio in response to an upcoming downslope.

SUMMARY

What is described is a system for reducing the likelihood of brakes of a vehicle overheating when the vehicle is towing a trailer. The system is also used to provide the driver with better control and handling of the vehicle when the vehicle is towing a trailer. The system includes a transmission configured to operate in a plurality of gear ratios and a global positioning system (GPS) unit configured to detect location data. The system also includes an input device configured to receive data indicating whether the trailer is connected to the vehicle and an electronic control unit (ECU) coupled to the transmission, the GPS unit and the input device. The ECU is designed to determine whether the vehicle is within a predetermined distance of a downgrade of a road based on the location data, determine a current gear ratio of the transmission, and determine whether it is desirable for the transmission to operate in a second gear ratio that is lower than the current gear ratio. This determination is based on whether the trailer is connected to the vehicle, whether the vehicle is within the predetermined distance of the downgrade, and the current gear ratio of the transmission.

Also described is a system for reducing the likelihood of brakes of a vehicle overheating when the vehicle is towing a trailer. The system includes a transmission configured to operate in a plurality of gear ratios, a sensor configured to detect a load applied to the vehicle by the trailer, and a global positioning system (GPS) unit configured to detect location data. The system also includes an electronic control unit (ECU) coupled to the sensor and the transmission. The ECU is designed to determine whether the vehicle is within a predetermined distance of a downgrade based on the detected location data and determine a current gear ratio of the transmission. The ECU is also designed to deteimine whether it is desirable for the transmission to operate in a second gear ratio that is lower than the current gear ratio based on the load applied to the vehicle by the trailer, whether the vehicle is within the predetermined distance of the downgrade, and the current gear ratio of the transmission. The system also includes an output device configured to output data when it is desirable for the transmission to operate in the second gear ratio.

Also described is a system for reducing the likelihood of brakes of a vehicle overheating when the vehicle is towing a trailer. The system includes a transmission configured to operate in a plurality of gear ratios and a global positioning system (GPS) unit configured to detect location data. The system also includes at least one of an input device configured to receive data indicating whether the trailer is connected to the vehicle or a sensor configured to detect whether the trailer is connected to the vehicle. The system also includes an electronic control unit (ECU) coupled to the transmission, the GPS unit and the input device. The ECU is designed to determine whether the vehicle is within a predetermined distance of a turn of a road or from the road based on the location data and determine a current gear ratio of the transmission. The ECU is also designed to determine whether it is desirable for the transmission to operate in a second gear ratio that is lower than the current gear ratio based on whether the trailer is connected to the vehicle, whether the vehicle is within the predetermined distance of the turn, and the current gear ratio of the transmission.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

FIGS. 5A-5C illustrate an exemplary use of a method similar to the method of FIG. 4 according to an embodiment of the present invention.

DETAILED DESCRIPTION

Disclosed herein are systems and methods for alerting a driver to an upcoming downgrade and/or for automatically downshifting a transmission of a vehicle to reduce unnecessary wear of the brakes. The systems provide several benefits and advantages such as informing the user of the downgrade so that he can downshift the transmission and/or automatically downshifting the vehicle when a downgrade is upcoming. The downshift is advantageous because the vehicle can use the transmission to decelerate instead of the brakes, thus decreasing the likelihood of the brakes overheating. The systems are also used to provide the driver with better control and handling of the vehicle when the vehicle is towing a trailer. The systems provide additional benefits such as the capability to determine when the vehicle is approaching a downslope by accessing map data from a memory or a remote database. This is advantageous because the driver/vehicle can be warned of unsigned, unknown or difficult to see downgrades. The systems provide an additional benefit and advantage in that they include one or more sensors for detecting downgrade information which can be stored in a memory or a remote database for use on later trips along the downslope. This is advantageous because the vehicle can learn the location of downgrades, along with other information corresponding to the downgrade, in order to alert the driver and/or automatically downshift on subsequent trips along the route.

An exemplary system includes a power source and a transmission coupled to the power source. The power source can generate power to propel a vehicle and the transmission can operate in a number of gear ratios to adjust a torque and rotational speed of the power generated by the power source. The system can also include a memory for storing map data that includes locations and downgrade information corresponding to some or all of the locations. The system can also include a GPS for providing location data corresponding to a current location of the vehicle. The system can also include a sensor for detecting downgrade information such that it can be stored in the map data of the memory and accessed during subsequent trips along the route. The system can also include an electronic control unit (ECU) for determining when the vehicle is approaching a downgrade based on the map data of the memory. The ECU is also designed to inform the driver that a downgrade is approaching and/or to automatically downshift the transmission when the vehicle is approaching a downgrade.

Figure 1:
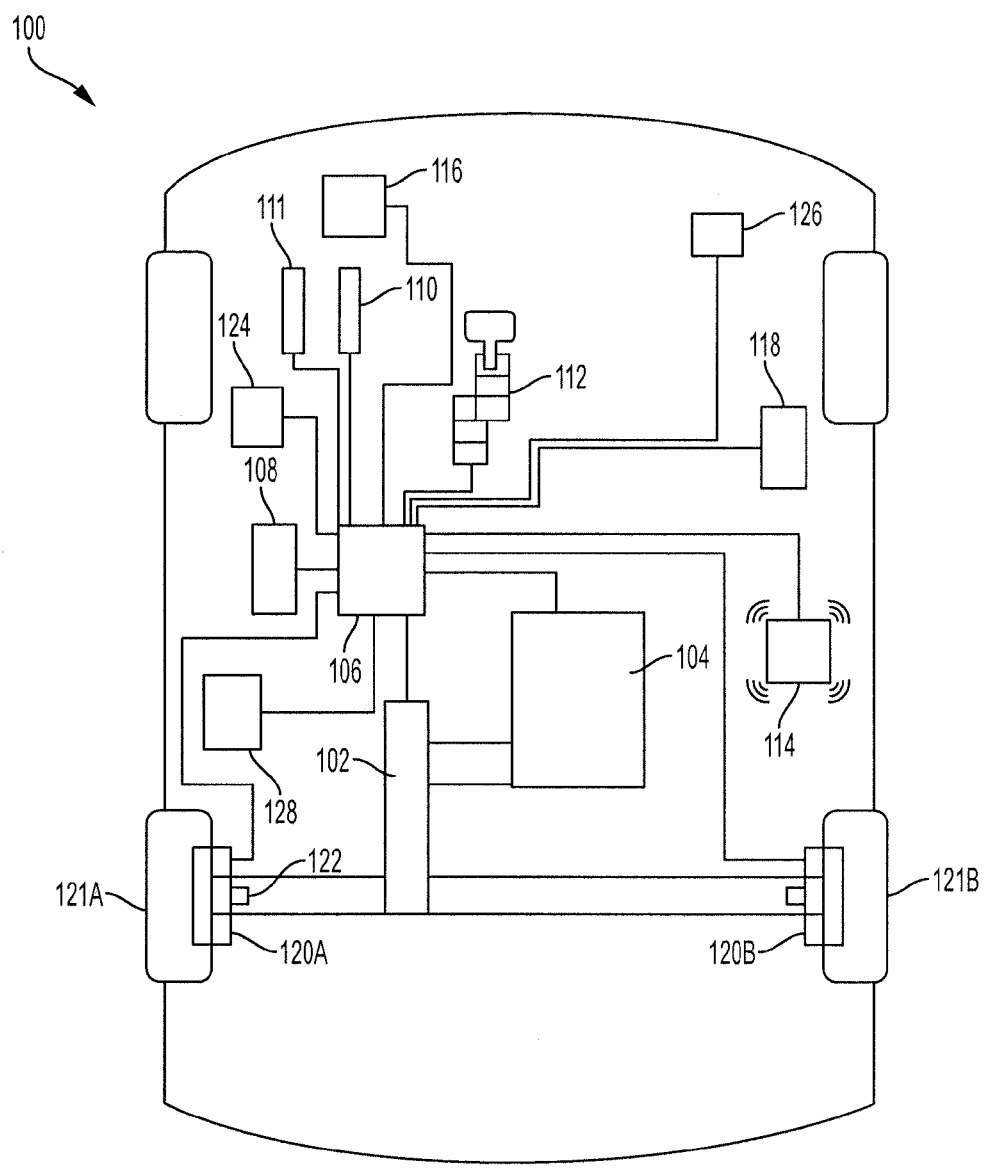
FIG. 1 is a block diagram illustrating components of a vehicle for alerting and/or downshifting in response to an upcoming downgrade according to an embodiment of the present invention.

With reference now to FIG. 1, a vehicle 100 can include an engine 104 mechanically coupled to a transmission 102. The vehicle 100 can also include an ECU 106, a memory 108 and a network interface device 114 coupled to the ECU 106 and/or the memory 108. The vehicle 100 can also include a brake pedal 110, an acceleration pedal 111, a gear shifter 112 and an input and/or output device 116 which may be positioned within a cabin of the vehicle 100. The vehicle 100 can include one or more brakes 120A, 120B coupled to wheels 121A, 121B. The vehicle 100 can also include one or more sensors including an IMU 118, a brake sensor 122, a speed sensor 124, a camera 126 and a global positioning system (GPS) unit 128.

The engine 104 may be an internal combustion engine capable of combusting a fuel to generate mechanical power, such as rotational power at a torque and an angular velocity. In some embodiments, the vehicle 100 may have a motor generator and a battery instead of or in addition to the engine 104. In these embodiments, the motor generator may convert electric charge stored in the battery into mechanical power. In that regard, the vehicle 100 may be a gas-powered vehicle, an electric vehicle or a hybrid vehicle. In some embodiments, the vehicle 100 may be a fuel cell based vehicle or a hybrid vehicle that utilizes fuel cell technology.

The transmission 102 can be any type of transmission such as a manual transmission, an automatic transmission, a continuously variable transmission (CVT), or a combined transmission such as tiptronic or semi-automatic transmission. The transmission 102 can receive power from the engine 104 via a shaft and transfer it, at a different torque and/or angular velocity, to the wheels 121. The transmission 102 can function in various gear ratios with the higher gear ratios (that correspond to lower gears) providing a relatively low angular velocity and relatively high torque and the lower gear ratios (that correspond to higher gears) providing a relatively large angular velocity and a relatively low torque.

The driver can take advantage of the properties of the transmission to perform engine braking in various situations. Based on various factors, such as total load (mass) of the vehicle 100, the grade of a downslope, the length of a downslope and specifications of the engine 104, the vehicle 100 may require a relatively large amount of braking when traveling downhill. The brakes 120 can wear out or degrade relatively quickly and/or can fail with sufficient braking. However, the acceleration of the vehicle 100 on a downslope can be reduced using engine braking. Engine braking occurs naturally when the acceleration pedal 111 is released (i.e., not being depressed) and increases in magnitude when the transmission 102 is in a relatively large gear ratio. Thus, a driver, or the ECU 106, can reduce wear and/or the likelihood of failure of the brakes 120 by shifting the transmission 102 to be in a higher gear ratio prior to traveling along a relatively long and/or steep downhill, particularly while the vehicle 100 has a large load attached thereto.

Engine braking can also be applied before a vehicle is to take a turn. The vehicle 100 may be required to significantly slow down prior to taking a relatively sharp turn in order to reduce the likelihood of the vehicle rolling over. Heavy brake usage prior to a turn or a curve is likewise undesirable, especially for vehicles with large loads. Thus, the transmission 102 can be shifted to a relatively high gear ratio in order to provide engine braking in these situations. Features of the vehicle 100 used for engine braking for downgrades can also be used with regards to engine braking for turns and/or curves.

For most transmissions (automatic and manual), it is desirable for the downshift to occur prior to beginning the downgrade because a torque disturbance can occur during a downshift while traveling on a downslope. This is especially true if the vehicle 100 has a large load attached thereto. The torque disturbance can be unpleasant and/or disrupt normal operation of the transmission 102, as well as potentially decrease the stability of the vehicle and/or the trailer. Whether a torque disturbance occurs is based on the type of transmission and is based on factors such as grade of the slope and the load of the vehicle. Thus, it is desirable to downshift prior to driving down a slope.

CVTs, however, can function in an infinite number of gear ratios. CVTs can change gear ratios relatively rapidly, simulating an automatic or manual transmission, or can gradually change gear ratios. A rapid change of gear ratio while traveling downhill can result in a torque disturbance. This can be avoided, however, by gradually increasing the gear ratio of the CVT. Thus, while it is still desirable for a CVT to downshift prior to traveling downhill, the benefit of an early shift is not as great as with a manual or automatic transmission as the torque disturbance can be avoided with gradual gear shifting of the CVT. In some situations, it may be desirable for the CVT to begin downshifting when the vehicle reaches the downgrade and to reduce the rate of change of the gear ratio (i.e., perform the shift over a longer period of time) while the gear ratio is increasing.

Returning to discussion of FIG. 1, the ECU 106 may be electrically coupled to some or all of the components of the vehicle 100. In some embodiments, the ECU 106 can include one or more processors or controllers specifically designed for automotive systems, and the functions of the ECU 106 can be implemented in a single ECU or in multiple ECUs. The ECU 106 can receive data from one or more components and control the operations of one or more components based on received or determined data. For example, the ECU 106 can receive data from the gear shifter 112 and control the transmission 102 based on the data received from the gear shifter 112, can control actuators within the engine 104 to improve performance of the engine 104 or the like.

For some transmissions, such as CVTs and automatic transmissions, the ECU 106 can control the gear ratio of the transmission 102. Thus, the ECU 106 can cause the transmission 102 to downshift to a desirable gear ratio for a known downgrade (or known upcoming turn) if an ECU 106 is provided certain information from the memory 108, the driver and/or the sensors. In some embodiments, the ECU 106 can also or instead generate feedback to be provided to the driver such as a warning of a downgrade (or turn), a desirable gear ratio, reasons for an automatic shift caused by the ECU 106 or the like.

The memory 108 may be coupled to the ECU 106 and may be a RAM memory, flash memory, ROM memory, EPROM memory, EEPROM memory, registers, hard disk, a removable disk, a CD-ROM, or any other form of volatile or non-volatile storage medium known in the art. The memory 108 may be a non-transitory memory or a data storage device and may further store machine-readable instructions which may be loaded and executed by the ECU 106. In some embodiments, the memory 108 may store map data which may or may not be updatable by the driver and/or the ECU 106. For example, as the ECU 106 receives data corresponding to a segment of road from one or more sensors, the ECU 106 may store the slope information in the memory 108 and associate the slope information with the corresponding location on the map.

The network interface device 114 may include a wired interface port such as a serial port, a Universal Serial Bus (USB) port, an Ethernet port, or other suitable wired connection. The ECU 106 may be able to communicate with a device, such as a tablet, a laptop or a smartphone that is connected to the wired interface. For example, a user may couple a smartphone to the network interface device 114 via a cable. The ECU 106 may then access a wireless network via the connected device. The network interface device 114 may also or instead include a wireless interface such as a transceiver (not shown) using any suitable wireless protocol such as Wi-Fi (IEEE 802.11), Bluetooth™, infrared, or other wireless standard. The ECU 106 may be able to communicate with a local device via the wireless interface and/or may be able to access the cloud via the wireless interface.

The network interface device 114 may receive map data from a remote device and/or the cloud and the map data may be accessed by the ECU 106 and/or stored in the memory 108. In some embodiments, the map data may be accessible by components of the vehicle 100 alone or may be accessible by components of more than one vehicle. The map data may include slope information corresponding to segments of roads and/or turn information corresponding to turns in the road. A driver of the vehicle 100 and/or the ECU 106 may be able to update the slope information and/or turn information based on detected data corresponding to slopes and turns.

The acceleration pedal 111 can be used by the driver to request acceleration. The acceleration pedal 111 can be coupled to the ECU 106 such that the ECU 106 causes the engine 104 to accelerate when acceleration is requested by the driver via the acceleration pedal 111.

The brakes 120 can be used for decelerating the vehicle 100. The brakes 120 may be disk brakes coupled to the wheels 121 and/or any other suitable vehicle brakes known in the art. In some embodiments, the brake pedal 110 can be directly coupled to the brakes 120 and/or the brake pedal 110 and directly control the operations of the brakes 120. In some embodiments, the brakes 120 may be coupled to the ECU 106 such that the ECU 106 can control the operations of the brakes 120 based on feedback received from the brake pedal 110. With brief reference to FIGS. 1 and 2, a trailer 200 may also include brakes (not shown). The brake pedal 110 can be used to control the action of the brakes 120 and/or the brakes of the trailer 200. In some embodiments, the trailer 200 may include a brake controller (not shown) that receives signals from the ECU 106 and/or the brake pedal 110 and controls the brakes of the trailer 200 based on the received signals.

The gear shifter 112 may be used by a driver for changing the gear ratio of the transmission 102. The gear shifter 112 may have various formats such as an automatic gear shifter (having park, drive, neutral and reverse gears), a manual gear shifter (having reverse and multiple drive gears), one or more paddle shifters or the like.

The vehicle 100 can also include an input and/or output device 116 such as one or more of a button, a dial, a microphone, a touchscreen, a display, a speaker, or the like. The input and/or output device 116 is coupled to the ECU 106 and can receive user input and/or provide output to a user. In that regard, the user can communicate with the ECU 106 via the input and/or output device 116. For example, the driver can update the map data with any known or detected changes in slope or turns using the input and/or output device 116 and the ECU 106 can output downgrade data to the driver via the input and/or output device 116.

The vehicle 100 may also include a plurality of sensors for detecting data corresponding to a status of the vehicle 100 or components thereof. In some embodiments, the sensors can detect data corresponding to an environment of the vehicle 100. The sensors may include an inertial measurement unit (IMU) 118 which may further comprise one or more of an accelerometer, a gyroscope, a magnetometer or the like. The IMU 118 can detect inertial measurement data corresponding to a position, velocity and/or acceleration of the vehicle 100 and can detect the inertial measurement data along one or more axes. The IMU 118 can be used to detect a slope of a road upon which the vehicle 100 is traveling and/or detect any turns of the vehicle. This data may be received by the ECU 106 and stored in the memory 108.

The sensors can also include a brake sensor 122 coupled to one or more of the brakes 120. The brake sensor 122 can be designed to detect data corresponding to a status of the brakes and may include one or more of a temperature sensor, a pressure sensor, a moisture or humidity sensor, a linear movement sensor or other types of sensors. The brake sensor 122 may be able to detect one or more of whether braking is occurring, an amount of pressure applied to the brakes 120, a temperature of the brakes or the like. The ECU 106 may use the data received from the brake sensor 122 to determine whether the vehicle 100 is traveling along a downgrade, whether the vehicle is approaching a turn and/or whether it would be desirable for the transmission 102 to operate in a higher gear ratio along the current segment. The ECU 106 may store this data in the memory 108.

The sensors of the vehicle 100 can also include a speed sensor 124. The speed sensor 124 may be any type of sensor capable of detecting a speed of the vehicle 100. The ECU 106 can use the data detected by the speed sensor to determine whether or not the vehicle is traveling on a downhill. For example, the ECU 106 may compare acceleration requested from the acceleration pedal 111 to changes in the detected speed of the vehicle 100. If the vehicle 100 is accelerating at a greater rate than the requested acceleration, the ECU 106 may determine that the vehicle 100 is traveling on a downgrade and may store this information in the memory 108. In some embodiments, the ECU 106 can determine the slope of the downgrade based on a known vehicle load and the detected acceleration.

The vehicle 100 can also include a camera 126. The camera 126 can include one or more cameras and can be positioned in the vehicle 100 such that it can detect image data corresponding to the road. The camera 126 may be capable of detecting image data corresponding to a slope and/or a turn of the road on which the vehicle is traveling. The camera 126 can also or instead detect signs along the road that indicate an upcoming downgrade. The ECU 106 can receive this data and store it in the memory 108.

The ECU 106 can thus create a map within the memory 108 and/or the cloud based on slope data detected by the sensors. In some embodiments, many vehicle ECUs can access and update the map data. When the map data is shared and updatable by numerous vehicles, a crowd-sourced map can be rapidly generated and have accurate data corresponding to downgrade data and/or curve data.

The vehicle 100 can also include a GPS unit 128. The GPS unit 128 provides location information corresponding to a location of the vehicle 100. The ECU 106 can receive this location information and compare the location information to map data to determine a relative location of the vehicle 100. The ECU 106 can determine when the vehicle 100 is approaching a downslope and/or turn by comparing the current location with map data that includes slope and/or turn information. The ECU 106 can then alert the driver (via the input and/or output device 116) and/or downshift the transmission 102 to reduce the likelihood of the brakes overheating and/or to provide the driver with better control and handling of the vehicle 100 when the vehicle 100 is towing a trailer 200 based on a known downslope and/or turn.

Figure 2:
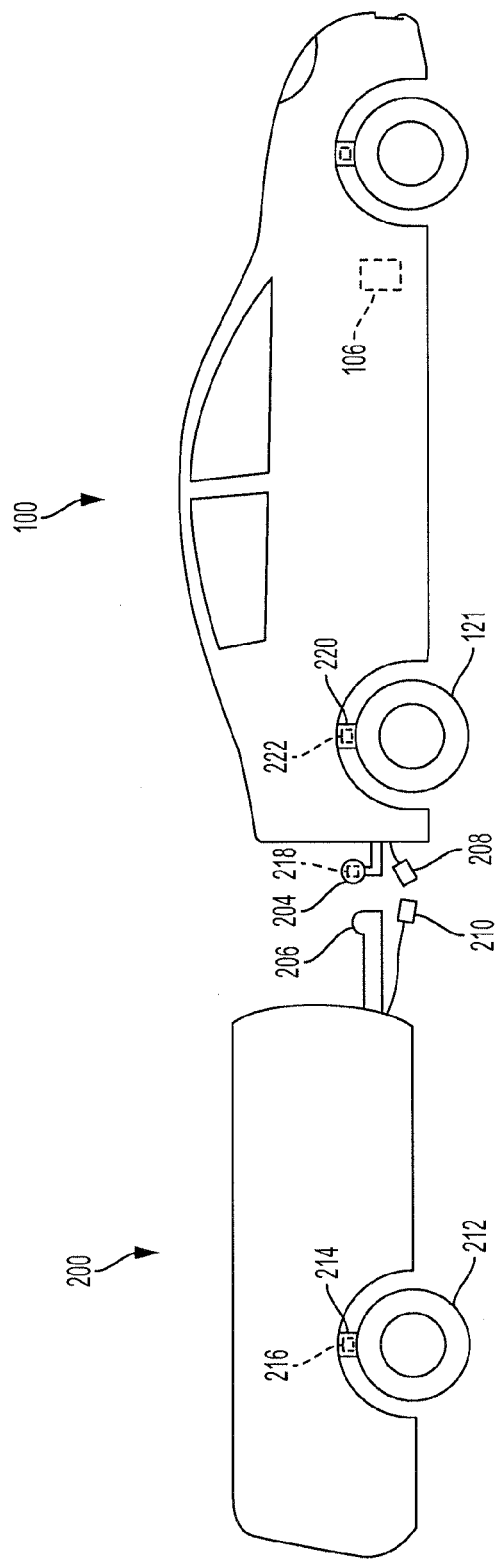
FIG. 2 illustrates the vehicle of FIG. 1 mechanically and electrically connected to a trailer according to an embodiment of the present invention.

Turning now to FIG. 2, the vehicle 100 can include a trailer hitch 204 for coupling a trailer 200 to the vehicle 100. The trailer 200 can include a hitch coupler 206 for mechanically connecting to the trailer hitch 204. The trailer hitch 204 is not limited to the ball hitch shown in FIG. 2 and can instead include any type of hitch known in the art. The vehicle 100 and the trailer 200 can also be electrically connected via a connector 208 of the vehicle 100 and a connector 210 of the trailer 200. The electrical connection allows data to be transferred between the vehicle 100 and the trailer 200. The transferred data can include control signals for controlling tail lights of the trailer 200, brakes of the trailer 200 and other devices of the trailer 200. The transferred data can also include data from sensors of the trailer 200.

The wheels 121 of the vehicle 100 can be coupled to the vehicle 100 via a suspension 220. Likewise, the trailer 200 can include wheels 212 coupled to the trailer 200 via a suspension 214.

When attached, the trailer 200 can significantly increase the load of the vehicle 100. Thus, the determination of when to adjust the gear ratio of the vehicle 100 is affected by the load applied by the trailer 200. In that regard, the vehicle 100 and/or the trailer 200 can include one or more sensors for detecting, and/or the ECU 106 can include logic for determining, the load applied to the vehicle 100 by the trailer 200.

In some embodiments, the ECU 106 can determine whether to provide a warning and/or to automatically downshift based on whether a trailer is attached or not. In some embodiments, the determination of whether to provide a warning and/or to downshift is based on a known or estimated load of the vehicle 100 including any load applied by the trailer 200. The ECU 106 can determine whether the trailer 200 is attached and/or the load applied by the trailer 200 based on user input (such as via the input and/or output device 116 of FIG. 1), whether the connector 208 is connected to the connector 210, and/or data detected by one or more sensor.

With brief reference to FIGS. 1 and 2, a user may input data indicating whether a trailer is attached using the input and/or output device 116. The user can also input an estimated load of the trailer 200 using the input and/or output device 116. In some embodiments, the vehicle 100 may include a tow mode switch (tow mode switch 310 of FIG. 3) that is to be turned to an on position when the trailer 200 is attached. The ECU 106 can determine whether the trailer 200 is attached based on any of this information.

The ECU 106 can also communicate with one or more components or sensors of the trailer 200 when the trailer 200 is electrically connected to the vehicle 100. In that regard, if the ECU 106 can communicate with components of the trailer 200 via the connector 208 and the connector 210, the ECU 106 assumes that the trailer 200 is connected to the vehicle 100.

The trailer 200 and/or the vehicle 100 can include sensors for detecting the load applied by the trailer 200. The sensors can include, for example, one or more of a hitch sensor 218 coupled to the trailer hitch 204 of the vehicle 100 and/or to the hitch coupler 206 of the trailer 200, a suspension sensor 222 coupled to the suspension 220 of the vehicle and/or a suspension sensor 216 coupled to the suspension 214 of the trailer 200. Each of the sensors can be coupled to the ECU 106 either directly or indirectly (such as the connector 208 and the connector 210).

The hitch sensor 218 can include any sensor capable of detecting a force such as a force sensing resistor, a load cell or the like. In some embodiments, when a force above a predetermined magnitude is detected, the ECU 106 may assume that the trailer 200 is connected to the vehicle 100. In some embodiments, the ECU 106 can determine the magnitude of the load based on the force detected by the hitch sensor 218.

The suspension sensor 222 can include one or more of a force sensor or a displacement sensor and can be placed on one or both of the rear suspension and the front suspension of the vehicle 100. The ECU 106 can determine whether the trailer 200 is connected to the vehicle 100 based on the known weight of the vehicle 100, the known values of the suspension 220 and the detected force or displacement. For example, under normal conditions, the suspension 220 may be displaced by 1 inch when one person is in the vehicle 100 and by 2 inches when four people are in the vehicle 100. However, when the trailer 200 is attached to the vehicle 100 and one person is in the vehicle 100, the suspension 220 may be displaced by 4 inches. Thus, the ECU 106 can determine that the trailer 200 is attached if the ECU 106 receives data indicating that the displacement of the suspension 220 is 4 inches or greater. Furthermore, the ECU 106 can include logic for determining or estimating the load applied to the vehicle 100 based on the detected force or displacement.

The suspension sensor 216 can likewise include one or more of a force sensor or a displacement sensor and can be placed on one or more suspension system of the trailer 200. The suspension sensor 216 can be electrically coupled to the ECU 106 via the connector 208 and the connector 210 such that the ECU 106 can receive the detected force or displacement from the suspension sensor 216. The ECU 106 can use the detected data from the suspension sensor 216 of the trailer 200 in a similar manner as the suspension sensor 222 of the vehicle 100.

Figure 3:
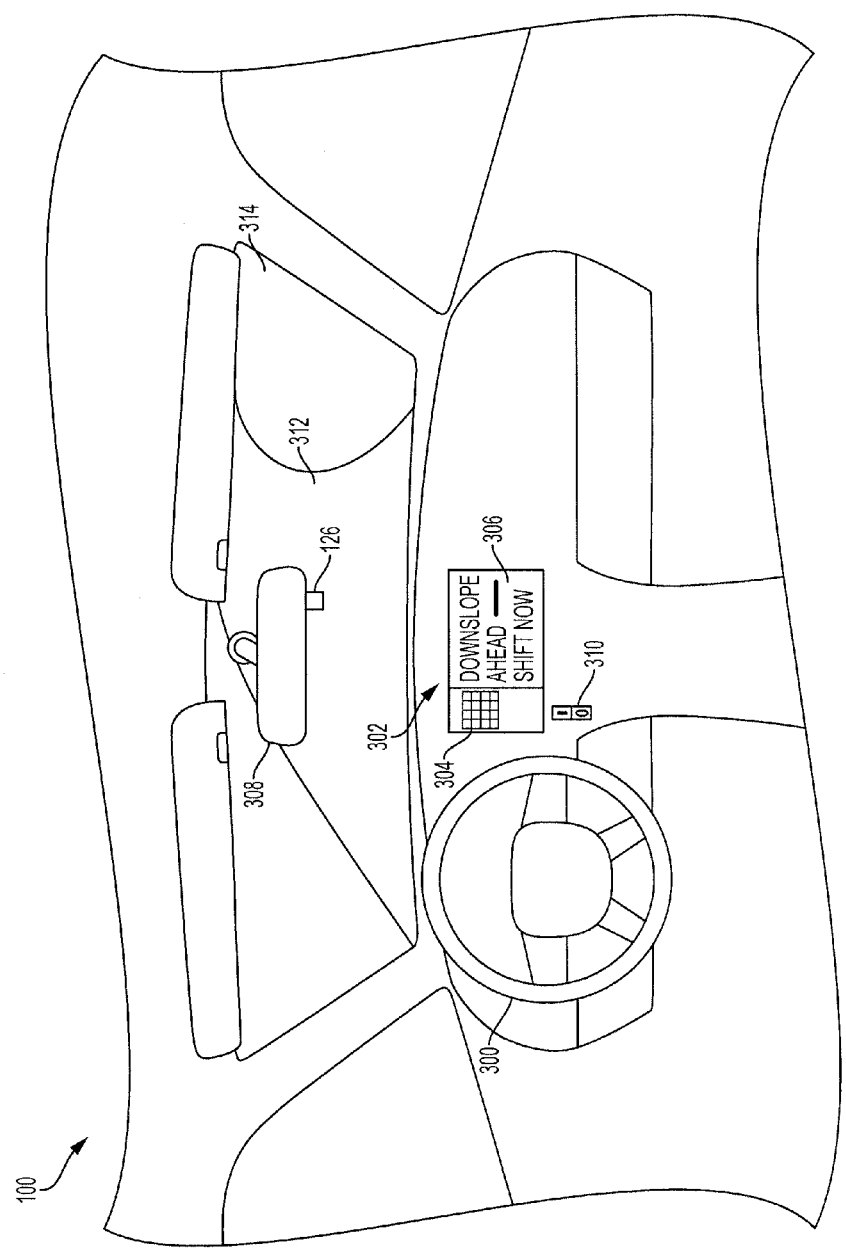
FIG. 3 is a driver's view of an interior of the vehicle of FIG. 1 according to an embodiment of the present invention.

Turning now to FIG. 3, an internal view of a cockpit of the vehicle 100 illustrates additional components of the vehicle 100 including a steering wheel 300, a touchscreen 302, the camera 126 coupled to a rear-view mirror 308 and the tow mode switch 310. The steering wheel 300 is used to turn the vehicle 100 in a desired direction.

The touchscreen 302 may be designed to receive input 304 and/or to output data 306. A user may use the touchscreen 302 to provide slope information corresponding to particular segments of roads, turn data corresponding to one or more turns in the road and/or trailer data indicating whether a trailer is attached and/or the load applied by the trailer. The ECU 106 can cause the touchscreen 302 to output data indicating whether a downshift would be desirable, a desired gear and/or a reason for an automatic downshift. If the downshift is automatic, it is desirable for the user to be made aware of the reasoning for the downshift in order to reduce the likelihood of the driver cancelling the downshift by performing an upshift of the transmission.

The camera 126 may be coupled to the rear-view mirror 308 or to any other structure of the vehicle 100. It is desirable for the camera 126 to be able to detect image data corresponding to objects external to the vehicle, such as data corresponding to a road 312. In that regard, it is desirable for the camera 126 to be positioned such that it can detect data through the windshield 314. The rear-view mirror 308 may be a preferred structure due to the unobstructed view of the road therefrom.

Figure 4:
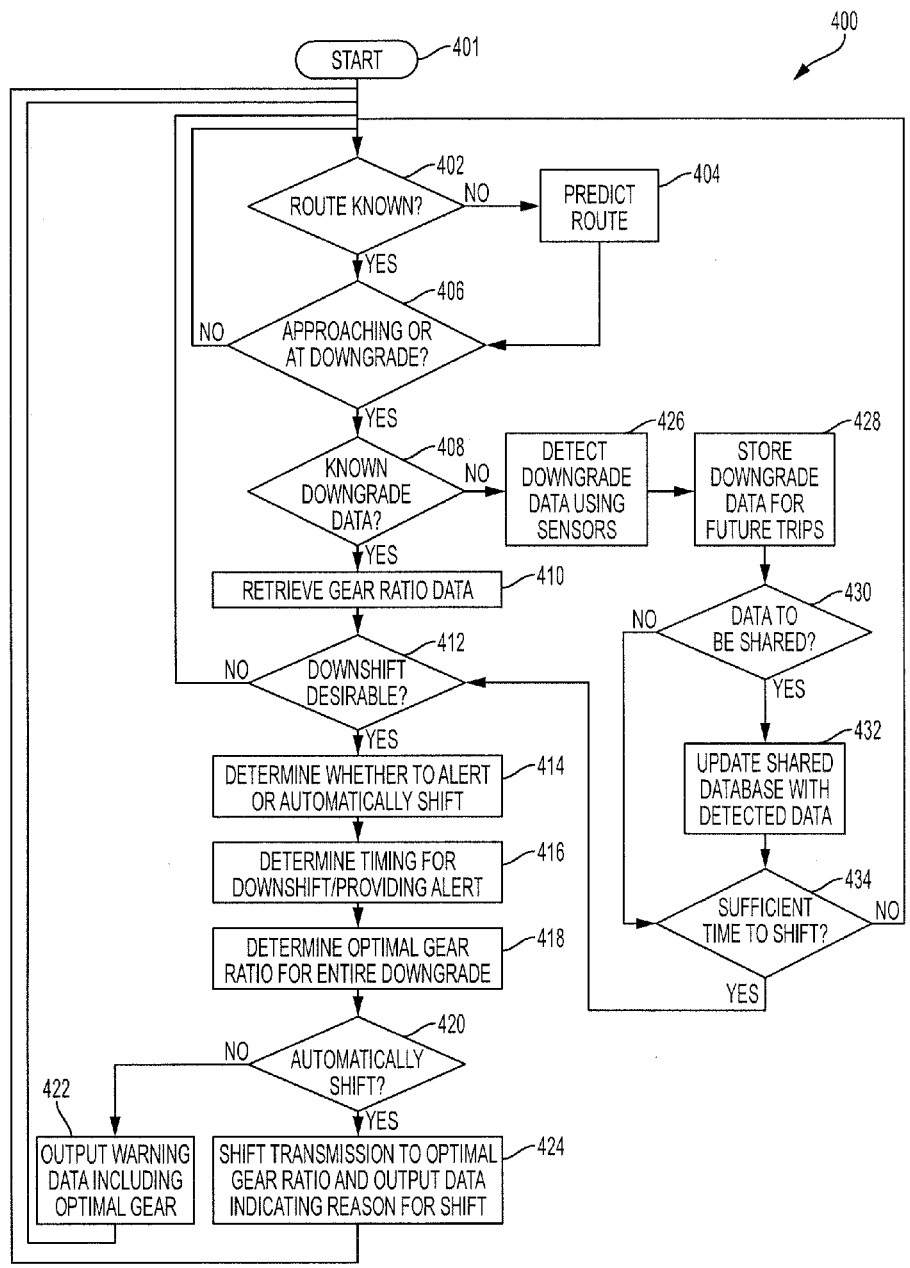
FIG. 4 is a flow chart illustrating a method for determining whether a downgrade is upcoming and alerting a driver and/or automatically downshifting a transmission of a vehicle according to an embodiment of the present invention.

With reference now to FIGS. 1, 2 and 4, a method 400 can be used by an ECU, such as the ECU 106, of a vehicle that is towing a trailer, such as the vehicle 100 and the trailer 200. The method 400 is for alerting a driver to an upcoming downgrade and/or automatically shifting a gear ratio of a transmission based on currently detected data, previously detected data and/or map data in order to reduce the likelihood of overheating of brakes, such as the brakes 120, or to provide the driver with better control and handling of the vehicle when the vehicle is towing a trailer. The method 400 is described with respect to providing alerts and/or downshifting in response to a detected or known downgrade; however, one skilled in the art will realize that the method 400 can also be applied to providing alerts and/or downshifting in response to a detected or known turn in the road.

Referring to FIG. 4, the method 400 may begin at 401, for example, when the vehicle is turned on. At 402, the ECU of the vehicle may determine whether the route is known. The route may be known if an address is provided to a GPS unit, for example, by a driver of a traditional vehicle or an operator of an autonomous vehicle.

If the route is not known, the ECU may predict a route at 404. Route prediction methods and systems are known in the art, and any of a variety of route prediction systems or methods can be used to predict the route in 404. In some embodiments, the ECU (or GPS unit) will predict one or more potential routes and a likelihood of each predicted route. The ECU can control the transmission based on the one or more potential routes and the likelihood for each. For example, if the likelihood of a first route being correct is 80 percent (80%) and the likelihood for each of 4 other routes is 5 percent (5%), the ECU can assume that the route will be the first route and control the transmission accordingly. However, if the likelihood for a particular route is 65 percent (65%), the ECU may not assume that any route is the next route, may assume that the route is the next route, and/or can reduce an amount that the ECU will downshift the transmission due to the relatively high uncertainty regarding the next route.

At 406, the ECU determines whether the vehicle is approaching or at a downgrade (or a turn). The vehicle may determine this based on data stored in a memory (such as map data), data received via a network interface device (such as streaming map data), or data detected by one or more sensors (such as an accelerometer, a camera or the like). In some embodiments, the ECU may determine that the vehicle is approaching a downgrade when the vehicle is within a predetermined distance of the downgrade such as 2 miles, 1 mile, ½ of a mile, ¼ of a mile, ¹⁄₁₀ of a mile, or within any other predetermined distance.

At 408, the processor may determine whether data corresponding to the downgrade is known. For example, the data may include a grade (or multiple grades, also known as the slope or gradient) of the downgrade, a length of the downgrade, or other data. In some embodiments, the ECU may determine that the data corresponding to the downgrade is known when certain data (such as the length and grade) or any data corresponding to the downgrade is stored in a memory or received from a remote system.

When applied to turns instead of downgrades, the processor may determine turn data including a radius of the turn, an angle of the turn and a length of the turn.

At 410, the ECU may receive gear ratio data from the memory, from any remote device (such as a remote map provider), and/or any sensor of the vehicle or the trailer. The gear ratio data includes the downgrade data (or turn data) that is used in the determination of whether a shift will be made and an optimal gear or gear ratio of the transmission for the downgrade. The downgrade data can include, for example, the length of the downgrade and the grade of the downgrade. This can further include data such as whether the grade varies over the length of the entire downgrade. For example, a downgrade may have a first segment having a first grade, a second segment having a second grade that is different than the first grade and a third segment having a third grade that is different than the first grade and the second grade. The downgrade data can include the length and grade of each of the first segment, the second segment and the third segment. The downgrade data can be detected by one or more sensors, can be retrieved from the memory and/or can be received from a remote system or device such as a GPS or a map provider.

The gear ratio data can also include load data corresponding to an attached trailer. For example, the load data can include whether a trailer or other load is attached to the vehicle and/or a value of the load (such as a weight). The load data can be detected by one or more sensors (such as a force sensor on a trailer hitch of the vehicle) and/or input provided by the user.

The gear ratio data can also include specific vehicle data corresponding to specifications of the vehicle. For example, the specific vehicle data can include a current state of the brakes, a type of brake used, what specific gear ratios are available, how much braking force can be applied by the engine at each gear ratio or the like. The specific vehicle data can be stored locally in a memory, can be detected by one or more sensors (such as a brake pad sensor) and/or can be received from a remote system or device.

The gear ratio data can also include temporary condition data corresponding to temporary conditions of the environment and/or the road. For example, the temporary condition data can include whether one or more lanes of the road are closed, whether the speed limit has been temporarily changed, whether construction is being performed on a road, whether snow or ice is present on the road, whether wind is blowing, a direction of the wind, a speed of the wind or the like. The temporary condition data can be detected by one or more sensors and/or received from a remote system such as a navigation provider.

The ECU can determine whether a downshift is desirable based on some or all of the received gear ratio data at 412. For example, the ECU can determine that a trailer is attached to a vehicle having an automatic transmission and that the vehicle is approaching a downgrade having a first segment of 3 miles and three percent (3%) grade and a second segment of 5 miles and four percent (4%) grade. The ECU may or may not retrieve additional data. Based on the received data, the ECU may determine that the vehicle would require significant braking on the downgrade to prevent acceleration of the vehicle and, thus, that the downshift would be desirable. If the gear ratio data includes temporary condition data, such as whether a lane is closed, if a speed limit is lowered, if construction is performed or the like, then the ECU may determine that additional braking is required on the downgrade.

At 414, the ECU may determine whether to alert the driver or to perform the shift automatically. In some embodiments, the user can input whether he prefers to receive the alert or for the ECU to automatically shift and the ECU will provide the alert or automatically shift based on the user input. In some embodiments, the ECU may be programmed to perform one or both of these actions and the user may or may not be able to change the programming. In some embodiments, the ECU may determine whether to alert or shift based on the gear ratio data. For example, the ECU may cause the transmission to shift if the downgrade will require a relatively large amount of braking and may determine to alert the driver if the downgrade will require relatively little braking. The ECU may be designed to alert the driver even when the ECU performs the shift automatically. In some embodiments, the driver may have the final control over the vehicle (i.e., even if the ECU causes the downshift, the driver can upshift), allowing the final decision regarding a downshift to be made based on human observations. The alerts can also include a reason for the automatic or requested downshift. This is particularly advantageous as it can prevent the driver from cancelling the downshift immediately prior to a substantial downgrade.

At 416, the ECU can determine when to provide the alert and/or to downshift the transmission. For automatic and manual transmissions, it is desirable for the vehicle to shift prior to the vehicle beginning to travel along the downgrade because of the potential torque disturbance that a downshift on a downgrade can cause. Accordingly, the timing of the alert and/or the automatic downshift should allow the downshift to be completed prior to the beginning of the downgrade. However, it may be undesirable for the vehicle to shift a relatively large distance prior to reaching the downgrade due to potential engine wear and increased noise resulting from the increase in revolutions per minute (RPM) of the engine. In some embodiments, the ECU can provide the alert and/or downshift the transmission within 1 mile, within ½ of a mile, within ¼ of a mile, within ⅒ of a mile, or within any other predetermined distance of a downgrade. In some embodiments, the distance may be designed to provide sufficient time for the engine braking to reduce a speed of the vehicle. In some embodiments, the alert may be provided at a longer distance from the downgrade than the automatic shift in order to allow sufficient time for the driver to perform the shift. In some embodiments, the determination of when to provide the alert may be based on the gear ratio data. For example, the ECU may cause the shift to occur at a larger distance from the downgrade when the grade is relatively large than when the grade is relatively small to reduce the likelihood of a torque disturbance.

Briefly turning to application of the method 400 to turns, it is desirable for the vehicle to have slowed down prior to a turn. Thus, the ECU may first determine a desired speed for the turn based on the gear ratio data. Based on the gear ratio data and a desired speed for the turn, the ECU can provide the alert and/or downshift prior to a turn with sufficient time for the vehicle to slow to the desired speed.

Returning to discussion of downgrades, it may still be desirable for CVTs to downshift prior to reaching the downgrade. However, due to the fact that CVTs can continuously increase in gear ratio, it may not be undesirable for the CVT to downshift while on a downgrade. If the downshift is completed over a relatively large amount of time, the torque disturbance can be prevented. Thus, in some embodiments, the alert and/or automatic downshift of a CVT can be performed a shorter distance from the downgrade and, potentially, even while the vehicle is traveling along (e.g., at the beginning of) the downgrade. However, for alerting/downshifting with regard to turns, it is desirable for the ECU of a vehicle having a CVT to alert the driver and/or perform the downshift with sufficient time for the vehicle to slow to the desired speed prior to a turn.

At 418, the ECU may determine the optimal gear ratio for the entire downgrade. The optimal gear ratio may be determined based on some or all of the gear ratio data and the determination may be different for manual/automatic transmissions and for CVTs. As described above, it is undesirable for a manual or automatic transmission to shift while traveling along a downgrade due to potential torque disturbances. Thus, it may be desirable for the gear ratio to be set to the highest optimal gear ratio for the entire downgrade. Continuing the above example where the downgrade includes a first segment of 3 miles and three percent (3%) grade and a second segment of 5 miles and four percent (4%) grade, the optimal gear ratio may be greater for the second segment than the first segment. For automatic and manual transmissions, the ECU may set the optimal gear ratio to the highest desired gear ratio for the entire downgrade. Thus, continuing the example, the ECU may set the optimal gear ratio of the entire downgrade to the optimal gear ratio of the second segment. This reduces the likelihood of the brakes overheating and provides better control of the vehicle and further reduces the likelihood of a need for a second downshift, which may cause a torque disturbance.

Because CVTs can extend the time of a downshift to prevent a torque disturbance, an ECU of a vehicle having a CVT may not automatically select the highest gear ratio for the entire downgrade as the optimal gear ratio of the entire downgrade. The ECU may instead continue to change the gear ratio and/or the rate of change of the gear ratio based on a current or upcoming segment of a downgrade. In that regard, the ECU can also adjust the gear ratio based on currently detected data. For example, if the memory of the vehicle indicates that the downgrade for a particular segment is three percent (3%) but its sensors detect that the downgrade is six percent (6%), the ECU can increase the gear ratio to compensate for the additional three percent (3%) grade.

At 420, if the vehicle is not to automatically shift, the method proceeds to 422 where the ECU can cause an output device to output data indicating the upcoming downgrade and/or that a downshift is desirable. In some embodiments, the output data can include some or all of the gear ratio data so that the driver can decide whether to downshift and/or to which gear to downshift based on the gear ratio data. In some embodiments, the output data may indicate that a downshift is desirable and may or may not indicate the optimal gear.

If the vehicle is to automatically shift, the ECU may control the transmission to shift into the optimal gear ratio at 424. In some embodiments, the ECU may also cause the vehicle to output data similar to the output data of 422.

Returning to 408, if sufficient downgrade information is not known (for example, not enough information to determine whether a downshift is desirable, not enough information to determine an optimal gear ratio or not enough information to deteimine if a downgrade is present), the method 400 may proceed to 426. At 426, the vehicle can detect downgrade data using one or more sensors as discussed above with reference to FIGS. 1 through 3. For example, an accelerometer can detect a grade, a camera can detect a sign indicating an upcoming downgrade, a sensor coupled to the gear shifter can detect a downshift performed by the driver or the like.

At 428, the ECU can store the detected downgrade data in the memory of the vehicle. During a subsequent trip along the current segment, the ECU can retrieve the downgrade data for use in blocks 408 and 410.

In block 430, the ECU determines whether data is to be shared with other devices and/or a remote database and in block 432, the ECU can update the shared database with the detected data. Some, all or none of the detected downgrade data may be shared with other vehicles. For example, a shared memory (such as in the cloud) can include map information having grade information. The grade information may be updated by vehicles as they traverse roads, allowing the map data to be updated via crowd sourcing. Additionally, autonomous vehicles having these sensors can travel along roads and update the map data with any detected grade information. Some of the downgrade data, however, may not be suitable for sharing with other vehicles. For example, an ECU may assume that the vehicle should downshift at approximately the same location as a previously detected downshift. This shifting data may not directly correspond to whether another vehicle should downshift at the current location due to the variety of engine specifications and loads of vehicles. However, in some embodiments, the ECU can share locations of downshifts performed by the driver along with the vehicle specifications and load data, which may be sufficient for other ECUs to determine whether a shift is desirable at that location.

The ECU and/or a remote processor can integrate all detected data into the downgrade data. For example, if 5 vehicles report a grade of five percent (5%) and one vehicle reports a grade of two percent (2%), the ECU or remote processor can determine that the five percent (5%) grade is more than likely accurate. As another example, if the driver performs a downshift at a location but one or more sensors do not detect a downgrade within a predetermined distance of the downshift, the ECU may determine that the driver downshifted for a reason other than a downgrade.

At 434, the ECU determines whether there is sufficient time to downshift without resulting in a torque disturbance. This determination may be made based on whether the transmission is automatic, manual or a CVT, a distance to the downgrade, a grade of the downgrade or the like.

Figure 5A:
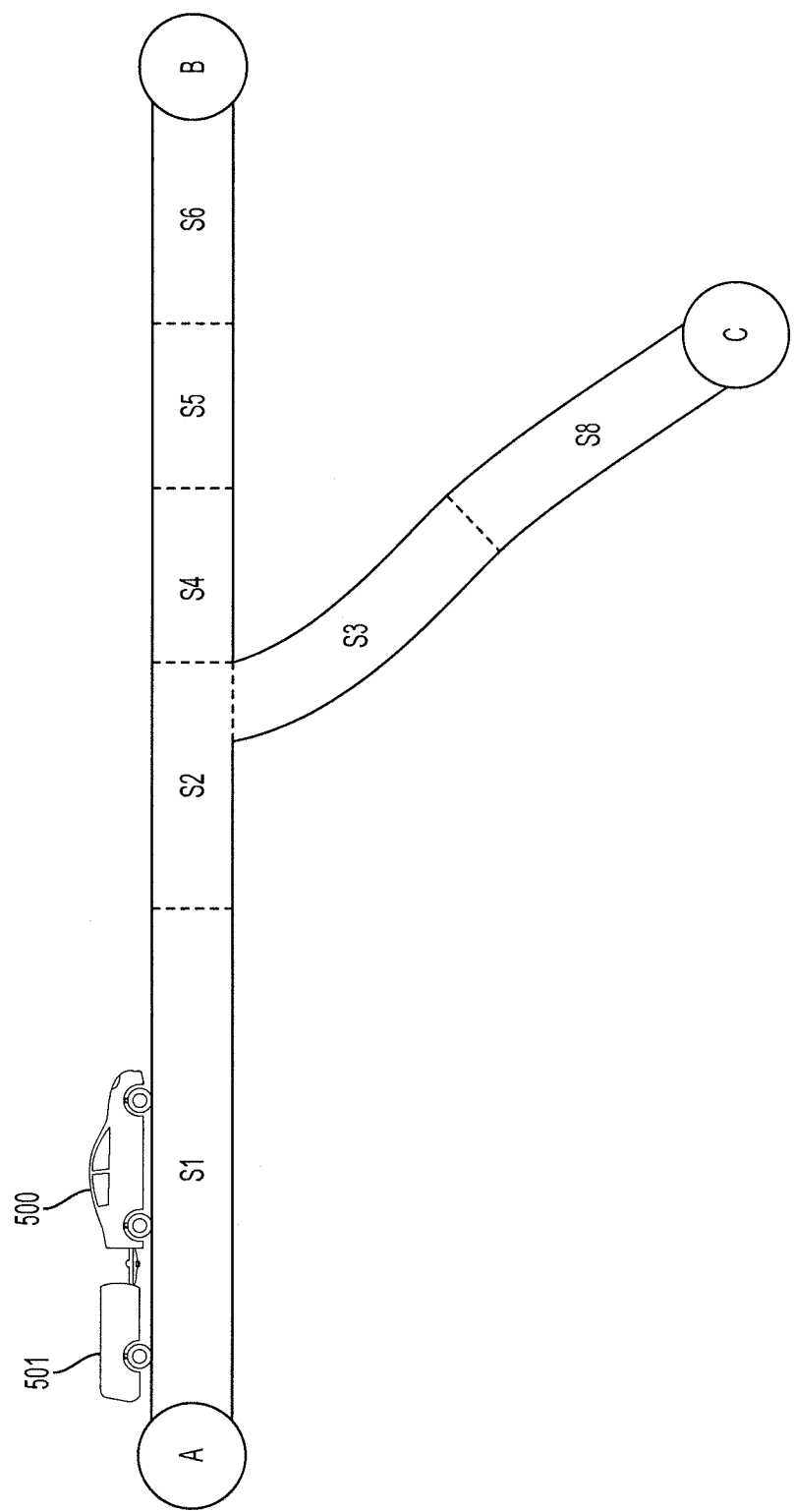
Figure 5B:
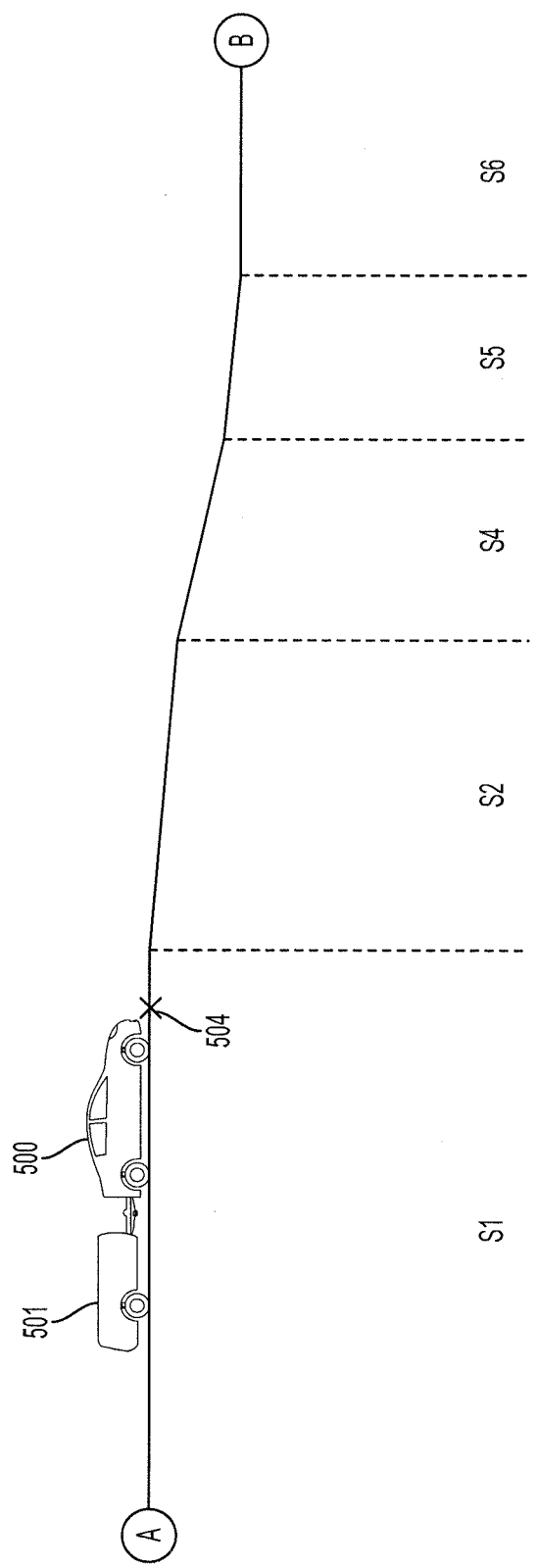

Turning now to FIGS. 5A through 5C, an exemplary use of a method similar to the method 400 of FIG. 4 is shown. The example may be performed by a vehicle 500 having similar features as the vehicle 100. In the example, the vehicle 500 may travel from a first location A to a second location B. In order to move from location A to location B, the vehicle 500 traverses multiple segments of the route including segments S1, S2, S4, S5 and S6. Another segment S3 is connected to segment S2, and may be followed by a segment S8 leading to a third location C. The segments may be parsed based on one or more factors such as similarity in grade (i.e., a portion of road having a grade within 0.5% can be a single segment), by length (i.e., each 5 miles can be a different segment), by intersections, and/or by any combination and/or additional factors.

A table 502 stored in a memory of the vehicle 500 or in a remote database may include downgrade data for each segment. The table 502 is exemplary only and a table having similar and/or different data, and/or use of other or no data structures, can be used without departing from the scope of the disclosure. The table 502 may include, for example, the next segment, the likelihood of the next segment being traversed, any alternative segments and the likelihood of each alternative segment being traversed. Similarly, the table 502 may include a grade and a length of each of the segments. The table 502 can also include any previously detected data. In some embodiments, the previously detected data can be incorporated into the grade and/or length columns of the table 502 instead of or in addition to the previously detected data column.

As the vehicle 500 is traveling along segment S1, the transmission of the vehicle does not need to be in a relatively high gear ratio as no downgrade is present. However, the next three segments S2, S4 and S5 each have a grade of four percent (4%), six percent (6%) and three percent (3%), respectively. The ECU of the vehicle 500 may deteimine that the vehicle 500 is connected to and towing a trailer 501 and that the transmission of the vehicle 500 should downshift based on the known downgrade data and the load data corresponding to the trailer 501.

The ECU may then determine that the vehicle 500 should downshift at location 504 that is a predetermined distance from the beginning of the downgrade in S2. The ECU may also determine that an optimal gear for segments S2 and S5 is a fourth gear and that an optimal gear for segment S4 is a third gear (with lower gears corresponding to higher gear ratios). Because the vehicle 500 has an automatic transmission, the ECU may cause the transmission to shift to the third gear when the vehicle 500 reaches the location 504.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for reducing the likelihood of brakes of a vehicle overheating when the vehicle is towing a trailer comprising:
    a transmission configured to operate in a plurality of gear ratios;
    a global positioning system (GPS) unit configured to detect location data;
    an input device configured to receive data indicating when the trailer is connected to the vehicle or when the trailer is disconnected from the vehicle; and
    an electronic control unit (ECU) coupled to the transmission, the GPS unit and the input device and configured to:
        determine when the vehicle is within a predetermined distance of a downgrade of a road based on the location data,
        determine a current gear ratio of the transmission,
        determine when a downshift condition has been met based on the current gear ratio when the trailer is connected to the vehicle and the vehicle is within the predetermined distance of the downgrade; and
        cause the transmission to operate in a second gear ratio that is lower than the current gear ratio when the downshift condition has been met.

2. The system of claim 1 wherein the downgrade includes a first section having a first distance and a first slope and a second section having a second distance that is different than the first distance and a second slope that is different than the first slope and wherein ECU is further configured to determine a third gear ratio corresponding to a desired gear ratio of the first section and a fourth gear ratio corresponding to a desired gear ratio of the second section and to set the second gear ratio to be equal to the lower of the third gear ratio or the fourth gear ratio.

3. The system of claim 1 further comprising an engine coupled to the transmission and wherein the ECU is further configured to determine the second gear ratio based on at least one of a distance of the downgrade, a slope of the downgrade, a predetermined condition or specifications of the engine.

4. The system of claim 1 further comprising an output device configured to output data and wherein the ECU is further configured to cause the output device to output data indicating that it is desirable for the transmission to operate in the second gear ratio when the ECU determines that the downshift condition has been met.

5. The system of claim 1 wherein the transmission includes a continuously variable transmission (CVT) and the ECU is further configured to cause the current gear ratio of the transmission to continuously increase to the second gear ratio over a predetermined period of time while the vehicle is traveling along the downgrade.

6. The system of claim 1 further comprising at least one of a memory configured to store map data including grade information or a network interface device configured to receive the map data including the grade information and wherein the ECU is further configured to determine when the vehicle is within the predetermined distance of the downgrade by comparing the location data to the map data.

7. The system of claim 6 further comprising a sensor configured to detect grade data corresponding to a current grade of the road and wherein the ECU is coupled to the sensor and the memory and is further configured to store the detected grade data and the location data detected by the GPS unit in the memory.

8. The system of claim 7 further comprising brakes configured to decelerate the vehicle in response to input and wherein the sensor includes at least one of an accelerometer configured to detect the current grade of the road, a brake sensor configured to detect an amount of pressure applied to the brakes, a temperature sensor configured to detect data corresponding to a temperature of the brakes, a shift sensor or gear ratio sensor configured to detect the current gear ratio of the transmission, or a speed sensor configured to detect a speed of the vehicle.

9. The system of claim 1 further comprising at least one of a camera configured to detect image data corresponding to a steep grade caution sign indicating an upcoming downgrade or a wireless interface configured to receive a wireless signal including grade information corresponding to the upcoming downgrade and wherein the ECU is further configured to determine when the downshift condition has been met based on the at least one of the detected image data or the received wireless signal.

10. A system for reducing the likelihood of brakes of a vehicle overheating when the vehicle is towing a trailer comprising:
    a transmission configured to operate in a plurality of gear ratios;
    a sensor configured to detect a load applied to the vehicle by the trailer;
    a global positioning system (GPS) unit configured to detect location data; and
    an electronic control unit (ECU) coupled to the sensor and the transmission and configured to:
        determine when the vehicle is within a predetermined distance of a downgrade based on the detected location data,
        determine a current gear ratio of the transmission,
        determine when a downshift condition has been met when the vehicle is within the predetermined distance of the downgrade based on the load applied to the vehicle by the trailer and the current gear ratio of the transmission transmission, and
        cause the transmission to operate in the second gear ratio when the downshift condition has been met.

11. The system of claim 10 further comprising an output device configured to output data indicating it is desirable for the transmission to operate in the second gear ratio when the downshift condition has been met.

12. The system of claim 10 wherein the downgrade includes a first section having a first distance and a first slope and a second section having a second distance that is different than the first distance and a second slope that is different than the first slope and wherein ECU is further configured to determine a third gear ratio corresponding to a desired gear ratio of the first section and a fourth gear ratio corresponding to a desired gear ratio of the second section and to control the second gear ratio to be equal to the lower of the third gear ratio or the fourth gear ratio.

13. The system of claim 11 further comprising an engine coupled to the transmission and wherein the ECU is further configured to determine the second gear ratio based on at least one of a distance of the downgrade, a slope of the downgrade, a predetermined condition, the load applied to the vehicle by the trailer or specifications of the engine.

14. The system of claim 10 wherein the transmission includes a continuously variable transmission (CVT) and the ECU is further configured to cause the current gear ratio of the transmission to continuously increase to the second gear ratio over a predetermined period of time while the vehicle is traveling along the downgrade.

15. The system of claim 10 further comprising at least one of a memory configured to store map data including grade information or a network interface device configured to receive the map data including the grade information and wherein the ECU is further configured to determine when the vehicle is within the predetermined distance of the downgrade by comparing the location data to the map data.

16. The system of claim 15 further comprising a second sensor configured to detect grade data corresponding to a current grade of a road and wherein the ECU is coupled to the second sensor and the memory and is further configured to store the detected data and the location data detected by the GPS unit in the memory.

17. A system for reducing the likelihood of brakes of a vehicle overheating when the vehicle is towing a trailer comprising:

a transmission configured to operate in a plurality of gear ratios;
a global positioning system (GPS) unit configured to detect location data;
at least one of an input device configured to receive data indicating when the trailer is connected to the vehicle or a sensor configured to detect when the trailer is connected to the vehicle; and
an electronic control unit (ECU) coupled to the transmission, the GPS unit and the input device and configured to:
 determine when the vehicle is within a predetermined distance of a turn of a road or from the road based on the location data,
 determine a current gear ratio of the transmission,
 determine when a downshift condition has been met based on the current gear ratio when the trailer is connected to the vehicle and the vehicle is within the predetermined distance of the turn; and
 cause the transmission to operate in a second gear ratio that is less than the current gear ratio when the downshift condition has been met.

18. The system of claim 17 wherein the ECU is further configured to determine the second gear ratio based on at least one of a distance of the turn, a radius of the turn or an angle of the turn.

19. The system of claim 17 further comprising a sensor configured to detect turn data corresponding to a turn of the road and a memory configured to store data, wherein the ECU is coupled to the sensor and the memory and is further configured to store the detected data and the location data detected by the GPS unit in the memory.

* * * * *